(12) United States Patent
Chang et al.

(10) Patent No.: US 6,895,217 B1
(45) Date of Patent: May 17, 2005

(54) STRATOSPHERIC-BASED COMMUNICATION SYSTEM FOR MOBILE USERS HAVING ADAPTIVE INTERFERENCE REJECTION

(75) Inventors: Donald C. D. Chang, Thousand Oaks, CA (US); Alan Cha, Glendale, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 809 days.

(21) Appl. No.: 09/644,224

(22) Filed: Aug. 21, 2000

(51) Int. Cl.[7] .................................................. H04B 7/19
(52) U.S. Cl. ..................... 455/13.2; 455/12.1; 455/427; 455/429; 455/430; 342/354; 342/372
(58) Field of Search .............................. 455/11.1–13.4, 455/427–431; 342/372–373, 354, 157

(56) References Cited

U.S. PATENT DOCUMENTS

| | | |
|---|---|---|
| 3,541,553 A | 11/1970 | Gubin |
| 3,720,953 A | 3/1973 | Ajioka |
| 4,085,368 A * | 4/1978 | Yeh .............................. 375/332 |
| 4,236,161 A | 11/1980 | Ohm |
| 4,343,005 A | 8/1982 | Han et al. |
| 4,555,782 A | 11/1985 | Alaria et al. |
| 4,635,063 A | 1/1987 | Chang et al. |
| 4,689,625 A | 8/1987 | Barmat |
| 4,722,083 A | 1/1988 | Tirro et al. |
| 4,727,503 A * | 2/1988 | McWhirter ................. 708/200 |
| 4,799,065 A | 1/1989 | Thompson |
| 4,819,227 A | 4/1989 | Rosen |
| 4,823,341 A | 4/1989 | Rosen |
| 5,017,927 A | 5/1991 | Agrawal et al. |
| 5,077,562 A | 12/1991 | Chang et al. |
| 5,081,464 A | 1/1992 | Renshaw |
| 5,151,706 A | 9/1992 | Roederer et al. |

(Continued)

FOREIGN PATENT DOCUMENTS

| | | |
|---|---|---|
| EP | 0 549 220 A2 | 6/1993 |
| EP | 0776 099 A2 | 5/1997 |
| EP | 0 860 952 A | 8/1998 |

(Continued)

OTHER PUBLICATIONS

U.S. Appl. No. 09/655,041, filed Sep. 5, 2000, Chang et al.
U.S. Appl. No. 09/611,753, filed Jul. 7, 2000, Chang et al.
U.S. Appl. No. 09/661,725, filed Sep. 14, 2000, Chang et al.
U.S. Appl. No. 09/661,967, filed Sep. 14, 2000, Feria et al.
K. K. Chan, F. Marcoux, M. Forest, L. Martins–Camelo, "A Circularly Polarized Waveguide Array for LEO Satellite Communications", pp. 154–157, IEEE1999 AP–S International Symposium, Jun. 1999.

(Continued)

*Primary Examiner*—William Trost
*Assistant Examiner*—Marcos L. Torres
(74) *Attorney, Agent, or Firm*—Georgann S. Grunebach; John A. Crook, III

(57) ABSTRACT

A system has a stratospheric platform with a payload controller and a phased array antenna having a plurality of elements. A gateway station communicates with the stratospheric platform. The gateway station scales the plurality of elements to form a reconfigurable plurality of beams. The gateway station communicates a control signal to the stratospheric platform to communicate a scaling of the elements. The stratospheric platform configures the elements of the phased array antenna according to the scaling using adaptive interference rejection. The gateway station has an adaptive beam processor coupled to user position files. The adaptive beam processor with the user position data can adaptively cancel interference from other beams.

17 Claims, 3 Drawing Sheets

U.S. PATENT DOCUMENTS

| | | |
|---|---|---|
| 5,218,619 A | 6/1993 | Dent .............................. 375/1 |
| 5,339,330 A | 8/1994 | Mallinckrodt |
| 5,365,239 A | 11/1994 | Stilwell, Jr. |
| 5,408,237 A | 4/1995 | Patterson et al. |
| 5,550,809 A | 8/1996 | Bottomley et al. ........... 370/18 |
| 5,555,257 A | 9/1996 | Dent ......................... 370/95.1 |
| 5,555,444 A | 9/1996 | Diekelman et al. |
| 5,572,216 A | 11/1996 | Weinberg et al. ........... 342/357 |
| 5,584,047 A | 12/1996 | Tuck |
| 5,589,834 A | 12/1996 | Weinberg et al. |
| 5,594,941 A | 1/1997 | Dent ......................... 455/13.4 |
| 5,612,701 A | 3/1997 | Diekelman |
| 5,617,410 A | 4/1997 | Matsumoto |
| 5,625,640 A | 4/1997 | Palmer et al. |
| 5,715,516 A * | 2/1998 | Howard et al. .......... 455/422.1 |
| 5,732,351 A | 3/1998 | Olds et al. |
| 5,734,982 A | 3/1998 | Endo et al. |
| 5,754,139 A | 5/1998 | Turcotte et al. |
| 5,764,187 A | 6/1998 | Rudish et al. |
| 5,790,070 A | 8/1998 | Natarajan et al. |
| 5,810,284 A | 9/1998 | Hibbs et al. .................. 244/13 |
| 5,825,325 A | 10/1998 | O'Donovan et al. |
| 5,856,804 A | 1/1999 | Turcotte et al. ............. 342/371 |
| 5,862,480 A | 1/1999 | Wild et al. |
| 5,890,067 A | 3/1999 | Chang et al. |
| 5,894,590 A | 4/1999 | Vatt et al. |
| 5,903,549 A | 5/1999 | Von der Embse et al. .. 370/310 |
| 5,907,816 A | 5/1999 | Newman et al. |
| 5,909,460 A | 6/1999 | Dent ......................... 375/200 |
| 5,909,470 A | 6/1999 | Barratt et al. |
| 5,917,447 A | 6/1999 | Wang et al. |
| 5,937,332 A | 8/1999 | Karabinis |
| 5,946,625 A | 8/1999 | Hassan et al. |
| 5,949,766 A | 9/1999 | Ibanez-Meier et al. ..... 370/316 |
| 5,963,862 A | 10/1999 | Adiwoso et al. |
| 5,966,371 A | 10/1999 | Sherman |
| 5,973,647 A | 10/1999 | Barrett et al. |
| 5,974,317 A | 10/1999 | Djuknic et al. |
| 5,982,337 A | 11/1999 | Newman et al. |
| 5,991,329 A | 11/1999 | Lomp et al. |
| 6,016,124 A | 1/2000 | Lo et al. |
| 6,016,421 A | 1/2000 | Weiss et al. |
| 6,018,316 A | 1/2000 | Rudish et al. |
| 6,020,845 A | 2/2000 | Weinberg et al. |
| 6,023,463 A | 2/2000 | Wiedeman et al. |
| 6,032,041 A | 2/2000 | Wainfan et al. |
| 6,047,186 A | 4/2000 | Yu et al. |
| 6,058,308 A | 5/2000 | Kallin et al. |
| 6,061,562 A | 5/2000 | Martin et al. |
| 6,072,986 A | 6/2000 | Blanchard et al. |
| 6,088,341 A | 7/2000 | Hinedi et al. |
| 6,111,542 A | 8/2000 | Day et al. |
| 6,147,658 A | 11/2000 | Higashi et al. |
| 6,151,308 A | 11/2000 | Ibanez-Meier et al. ..... 370/316 |
| 6,157,621 A | 12/2000 | Brown et al. |
| 6,157,811 A | 12/2000 | Dent |
| 6,160,994 A | 12/2000 | Wiedeman |
| 6,167,263 A | 12/2000 | Campbell |
| 6,173,178 B1 | 1/2001 | Hammill et al. |
| 6,188,896 B1 | 2/2001 | Perahia et al. |
| 6,195,037 B1 | 2/2001 | Gross et al. |
| 6,236,834 B1 | 5/2001 | Poskett et al. |
| 6,240,072 B1 | 5/2001 | Lo et al. |
| 6,272,317 B1 | 8/2001 | Houston et al. |
| 6,289,004 B1 | 9/2001 | Mesecher et al. |
| 6,308,085 B1 | 10/2001 | Shoki |
| 6,317,412 B1 | 11/2001 | Natali et al. |
| 6,324,398 B1 | 11/2001 | Lanzerotti et al. |
| 6,324,405 B1 | 11/2001 | Young et al. |
| 6,339,611 B1 | 1/2002 | Antonio et al. |
| 6,339,708 B1 | 1/2002 | Wang |
| 6,343,205 B1 | 1/2002 | Threadgill et al. |
| 6,366,256 B1 | 4/2002 | Ramanujam et al. |
| 6,374,080 B2 | 4/2002 | Uchida |
| 6,377,802 B1 | 4/2002 | McKenna et al. |
| 6,380,893 B1 * | 4/2002 | Chang et al. ................ 342/373 |
| 6,388,615 B1 | 5/2002 | Chang et al. |
| 6,388,634 B1 | 5/2002 | Ramanujam et al. |
| 6,392,611 B1 | 5/2002 | Smith et al. |
| 6,408,180 B1 | 6/2002 | McKenna et al. |
| 6,414,646 B2 | 7/2002 | Luh |
| 6,429,823 B1 | 8/2002 | Bains et al. |
| 6,434,384 B1 | 8/2002 | Norin et al. |
| 6,452,962 B1 | 9/2002 | Linsky et al. |
| 6,456,846 B2 | 9/2002 | Norin et al. |
| 6,463,282 B2 | 10/2002 | Norin et al. |
| 6,463,294 B1 | 10/2002 | Holma et al. |
| 6,507,314 B2 | 1/2003 | Chang et al. |
| 6,507,739 B1 * | 1/2003 | Gross et al. ................. 455/431 |
| 6,513,758 B1 | 2/2003 | Lloyd |
| 6,526,288 B1 * | 2/2003 | Khalifa et al. .............. 455/557 |
| 6,556,845 B1 | 4/2003 | Ide et al. |
| 6,559,797 B1 | 5/2003 | Chang |
| 6,567,052 B1 | 5/2003 | Wang et al. |
| 6,598,014 B1 * | 7/2003 | Rabideau et al. ........... 702/194 |
| 6,615,024 B1 | 9/2003 | Boros et al. |
| 2001/0004604 A1 | 6/2001 | Toshimitsu et al. |
| 2001/0038342 A1 * | 11/2001 | Foote .................... 340/870.02 |
| 2001/0048389 A1 | 12/2001 | Nakagawa |
| 2002/0006795 A1 | 1/2002 | Norin |
| 2002/0072361 A1 | 6/2002 | Knoblach et al. |
| 2002/0106041 A1 | 8/2002 | Chang et al. |
| 2002/0126042 A1 | 9/2002 | Chang et al. |
| 2002/0128044 A1 | 9/2002 | Chang et al. |
| 2002/0128045 A1 | 9/2002 | Chang et al. |
| 2002/0132643 A1 | 9/2002 | Chang et al. |
| 2002/0140602 A1 | 10/2002 | Chang et al. |
| 2002/0168991 A1 | 11/2002 | Kochanski et al. |
| 2003/0076258 A1 | 4/2003 | Chang et al. |

FOREIGN PATENT DOCUMENTS

| | | |
|---|---|---|
| EP | 0 961 416 A1 | 12/1999 |
| EP | 1 026 778 A | 8/2000 |
| EP | 1 139 583 A2 | 10/2001 |
| EP | 1 148 662 A2 | 10/2001 |
| EP | 1 152 552 A2 | 11/2001 |
| EP | 1 158 698 A2 | 11/2001 |
| EP | 1 161 001 A2 | 12/2001 |
| GB | 2 349 045 | 10/2000 |
| JP | 2001345747 A | 12/2001 |
| WO | WO 95/04407 | 2/1995 |
| WO | WO 96/31016 | 10/1996 |
| WO | WO 97 07609 A | 2/1997 |
| WO | WO 9851568 A | 11/1998 |
| WO | WO 99/13598 | 3/1999 |
| WO | WO 99/23769 | 5/1999 |
| WO | WO 00/14902 A2 | 3/2000 |
| WO | WO 01/93458 A2 | 12/2001 |
| WO | WO 01/95220 A2 | 12/2001 |
| WO | WO 01/95523 A3 | 12/2001 |
| WO | WO 01/97388 A3 | 12/2001 |
| WO | WO 01/97406 A3 | 12/2001 |
| WO | WO 02/058186 A2 | 7/2002 |
| WO | WO 02/058272 A2 | 7/2002 |
| WO | WO 02/058273 A2 | 7/2002 |

OTHER PUBLICATIONS

M. Oodo, R. Miura, Y. Hase, "Onboard DBF Antenna for Stratospheric Platform", pp. 125–128, IEEE Conference on Phased Array Systems and Technology, California, May 21–25, 2000.

Yokosuka Research Park, "The First Stratospheric Platform Systems Workshop", pp 1–216, May 12–13, 1999.

Suzuki, R. et al, :Mobile TDM/TDMA System With Active Array Antenna, Global Telecommunications Conference, 1991; Globecom '91, vol. 3, Dec. 2–5, 1991, pp. 1569–1573.

Chiba, Isamu et. al, "Digital Beam Forming (DBF) Antenna System for Mobile Communications", IEEE AES Systems Magazine, Sept. 1997, pp. 31–41.

Miura, Ryu et. al, "A DBF Self–Beam Steering Array Antenna for Mobile Satellite Applications Using Beam–Space Maximal–Ratio Combination", IEEE Trans. On Vehicular Technology, vol. 48, No. 3, May 1999, pp. 665–675.

Sato, Kazuo et al., "Development And Field Experiments of Phased Array Antenna For Land Vehicle Satellite Communications", IEEE Antennas and Propagation Society International Symposium, 1992, Jul. 1992, pp. 1073–1076.

Sakakibara, Kunio et. al, "A Two–Beam Slotted Leaky Waveguide Array for Mobile Reception of Dual–Polarization DBS", IEEE Transactions on Vehicular Technology, vol. 48, No. 1, Jan. 1999, pp. 1–7.

Colella, Nicholas J. et al., "The HALO Network™", IEEE Communications Magazine, Jun. 2000, pp. 142–148.

Colella, Nicholas J. et al., "High Speed Internet Access via Stratospheric HALO Aircraft", INET 99 Proceedings, Internet Society, Technology, Wireless, 13 pages, Jun. 8, 1999.

Colella, Nicholas, "HALO Network—The Birth of Stratospheric Communications Services & the Decline of Satellite Networks", http://www.angelhalo.com/techpaper6, Copyright 1997–1999.

U.S. Appl. No. 09/661,986, filed Sep. 14, 2000, Rosen et al.

Djuknic, Goran et al., "Establishing Wireless Communications Services via High–Aeronautical platforms: A Concept Whose Time Has Come?" IEEE Communications Magazine, Sep. 1997, pp. 128–135.

Martin, James N. et al., "HALO Network—The Cone of Commerce", http://www.angelhalo.com/techpaper2, copyright 1997–1998.

Martin, James N. et al., "HALO Network—Broadband Wireless Services from High Altitude Long Operation (HALO) Aircraft",http://www.angelhalo.com/techpaper2, copyright 1997–1998.

Akyildiz, Ian F. et al., "HALO (High Altitude Long Operation): A Broadband Wireless Metropolitan Area Network", IEEE International Workshop on Mobile Multimedia Communications, Nov. 1999, pp/. 271–275.

* cited by examiner

STRATOSPHERIC-BASED COMMUNICATION SYSTEM FOR MOBILE USERS HAVING ADAPTIVE INTERFERENCE REJECTION

TECHNICAL FIELD

The present invention relates generally to a mobile communication system and more particularly, to a mobile communication system using a stratospheric platform and a gateway station that forms the multiple beams on the ground.

BACKGROUND ART

In this communication age, content providers are increasingly investigating ways in which to provide more content to users as well as interfacing with users.

Communication satellites have become commonplace for use in many types of communication services, e.g., data transfer, voice communications, television spot beam coverage, and other data transfer applications. As such, "bent pipe" satellites transmit and receive large amounts of signals used or "multiple spot beam" configuration to transmit signals to desired geographic locations on the earth. Mobile applications such as telephones and personal digital applications are becoming increasingly popular.

All of these current mobile satellite communication systems, however, suffer from a variety of disadvantages. First, they all have limited frequency resources. Any given frequency over a given ground position can only be utilized by one user with mobile handset at a time. This is true regardless of the sophistication of the system, including systems that utilize multiple beam satellite designs. Even when multiple satellites are available at a given geographic location, the same frequency spectrum cannot be used by more than one nearby mobile handset user. The availability of multiple satellites merely serves to increase the availability of the system to that mobile handset user who is assigned the specific frequency spectrum. However, the total capacity of these mobile communication satellite systems is still limited by the inefficient usage of the frequency spectrum. Thus, the potential growth of these current satellite communication systems is inherently limited.

Additionally, current telecommunications systems only allow mobile-to-hub and hub-to-mobile communications in most of the low earth orbit nd medium earth orbit mobile satellite constellations. Mobile-to-mobile linkages require multiple hops between hubs. Thus, one user with a mobile handset utilizes a satellite at a frequency slot to communicate to his counterpart on the network. Other satellites on or in the same region cannot reuse the same frequency slot for other nearby handset users. Thus, if a secondary user nearby has a handset that requires a particular frequency, which is being utilized by the first user nearby, the second user is unable to access the system through the same frequency via different satellites.

As described in U.S. Pat. No. 5,903,549, satellites may use a phased array antenna to communicate with users on the ground. The phased array antenna is comprised of a plurality of elements that are used to form a beam. The beam forming is implemented by adjusting the amplitude and phase of each signal path routed to each feed element. Each individual signal path is routed to multiple feeds with relative amplitudes and phases, which define each intended beam. In the '549 patent, the beam forming has been removed from the satellite and is performed on the ground. This reduces the complexity of the payload of the satellite.

Implementing a mobile communication system using a satellite is relatively expensive due to the typical complexity of the satellite payload and the expense of launch. The satellites also use a relatively low gain antenna, which is sometimes inadequate for third generation (3-G) cellular type systems. Because of the complexity, the satellites cannot be deployed quickly and thus, from a business standpoint, marketshare may be lost. Also, as new technology develops, the satellite must be replaced which is also very expensive.

The "bandwidth density" over a populate area from a mobile satellite system is limited. It is not cost effective to form multiple beams with beam-widths on the order of 10 Km or less at S-band from satellites. The required aperture is about 1 Km in diameter from a geo-stationary satellite, and hundreds of meters on MEO satellites. However, we can design mobile system using similar techniques but on stratospheric platforms to improve "projected bandwidth density" by thousands of folds.

One limiting factor to the number of users of a system is interference between the various beams. To reduce interference, commonly either the number of users is reduced or the antenna aperture is increased. Maximizing users is a desirable goal. Also, increasing the antenna aperture increases the spacecraft weight which is undesirable.

It would therefore be desirable to provide a mobile communication system that is capable of rapid deployment, is easy to change should the technology inevitably change and reduces the amount of interference with adjacent beams to permit high throughput.

SUMMARY OF THE INVENTION

It is therefore an object of the invention to provide a mobile communication system that allows rapid deployment and provides adaptive interference rejection, in that the interference may be readily changed as conditions change. It is a further object of the invention to provide a stratospheric platform based mobile communication system.

In one aspect of the invention, a communication system has a stratospheric platform with a payload controller and a phased array antenna having a plurality of elements. A gateway station communicates with the stratospheric platform. The gateway station scales the plurality of elements to form a reconfigurable plurality of beams. The gateway station communicates an embedded control signal to the stratospheric platform to communicate a scaling of elements having adaptive interference rejection.

In a further aspect of the invention, a method of controlling a communication system having a stratospheric platform with a phased array antenna having a plurality of elements, comprises the steps of:

forming a plurality of beams in a gateway station by scaling a plurality of elements using adaptive interference rejection;

communicating the scaling of elements to a stratospheric platform; and generating the beams in response to the scaling of elements by the stratospheric platform.

One advantage of the invention is that due to the interference detection, system throughput is increased over conventional systems.

Another advantage of the invention is that the payload weight and power consumption are significantly reduced without impacting system performance. The whole beam forming and traffic switching or routing mechanisms, normally on board the platform, have been moved to ground, taking advantage of the unique "spoke and hub" communications traffic topology.

Other features and advantages of the present invention using digital beam forming on ground are readily apparent from the follow ing detailed description of the best mode for carrying out the invention when taken in connection with the accompanying drawings.

BRIEF DESCRIPTION OF THE DRAWINGS

FIG. 6 is a diagrammatic view of a laptop computer having an antenna.

BEST MODES FOR CARRYING OUT THE INVENTION

Figure 1:
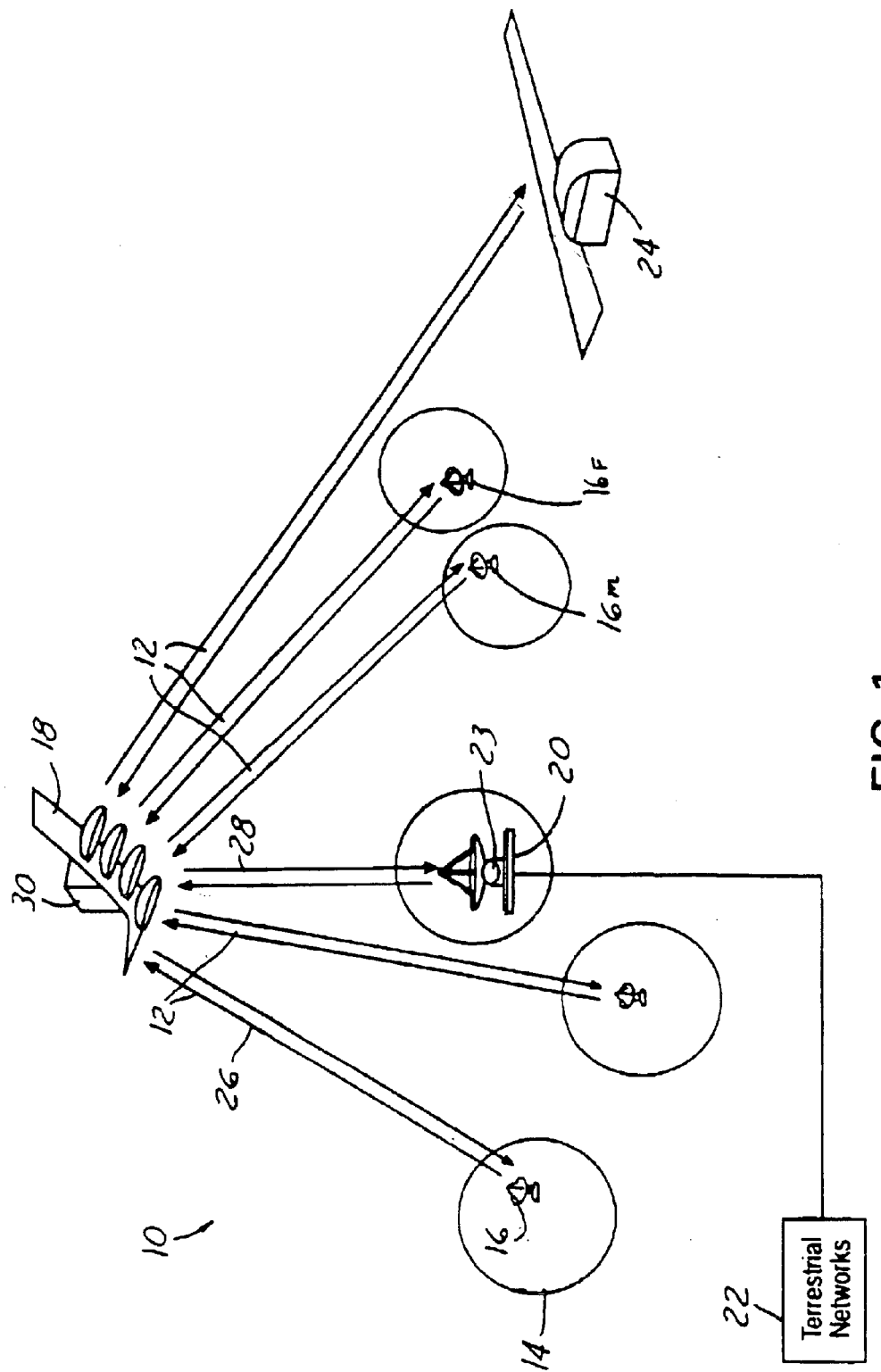
FIG. 1 is a system diagram of a communication system according to the present invention.

In the following description, the same reference numerals are used to identify the same components in the various views. Those skilled in the art will recognize that various other embodiments, structural changes and changes in measures may be made without departing from the scope of the invention.

Referring now to FIG. 1, a communications system 10 has a plurality of beams 12 that are illustrated as a plurality of circles 14 on the earth's surface. Circles 14 represent the footprint of a radiated beam onto the earth's surface. As will be described below the beams preferably move with the users. A plurality of user terminals 16M and 16F are used to illustrate mobile users and fixed users, respectively. Mobile users 16M may comprise but are not limited to automotive applications, personal digital assistant applications and cellular phone applications. Fixed user terminals 16F may, for example, comprise business-based or consumer-based communication systems. Each user terminal 16F and 16M may receive a signal with the predetermined signal strength from a spot beam pattern that is radiated from stratospheric platform 18. The present invention is particularly advantageous for use with mobile terminals 16M.

Communication system 10 further includes a gateway station 20 that is coupled to terrestrial networks 22. Communication system may also include a platform operations center 24. Both gateway station 20 and platform operations center 24 are in communication with stratospheric platform 18. Gateway station 20 provides a link between user terminals 16F, 16M and terrestrial networks 22 through stratospheric platforms 18. Platform operation center 24 provides command and control functions to communications platform 18. Although illustrated as two separate units, gateway station 20 and platform operation center 24 may be combined into the same physical location.

The communication signals between stratospheric platform 18 and user terminals 16M and 16F may be referred to as user links 26. User links 26 represent the transmit and receive beams from both categories of user terminals 16F, 16M and high altitude communications platform 18. A feeder link 28 is defined between high altitude communications platform 18 and gateway station 20.

High altitude communications platform 18 is preferably a stratosphere-based platform such as those under development by AeroVironment. Helios is one such project being developed by AeroVirornment and is an unmanned vehicle that can fly for several months at an altitude of over 60,000 feet above the earth. Helios is a solar-powered, electric plane that is modular in design and may be configured in a variety of ways. The stratospheric platform is operated through the platform operations center 24 to fly in a small radius flight path over a given spot on the earth. As far as users are concerned, the platform is geo-stationary. In addition to a plane-like platform, the stratospheric platform may comprise a balloon or blimp-like platforms.

Stratospheric platform 18 is used as a communication node for gateway station 20 and user terminals 16F and 16M, each of which have an antennas that are pointed in the direction of the high altitude communications platform 18. As will be described below, the pointing from mobile terminals 16M may be performed electronically. Although only one gateway station 20 is illustrated in the figure, those skilled in the art would recognize that various numbers of gateway stations may be employed. As would be further described below, gateway is station 20 with a high gain antenna that has a narrow beam width. The antenna may need a tracking mechanism with tracking speed adequate enough to maintain a communication link with the platform 18 throughout the flight path. Gateway station 20 may be coupled to terrestrial networks 22 such as the public service telephone network, the Internet, or an intranet. Gateway station 20 has communications processing facility 23 that controls the communication with the high altitude communications platform 18.

High altitude communication platform 18 has a payload 30 that links with user terminal 16M, 16F through the use of a phased array antenna and gateway station 20 with a feeder link antenna (preferably a parabolic dish) described below. In the present example, the payload 30 is used to generate a plurality of user beams configured according to the signals as determined in the gateway station 20.

Figure 2:
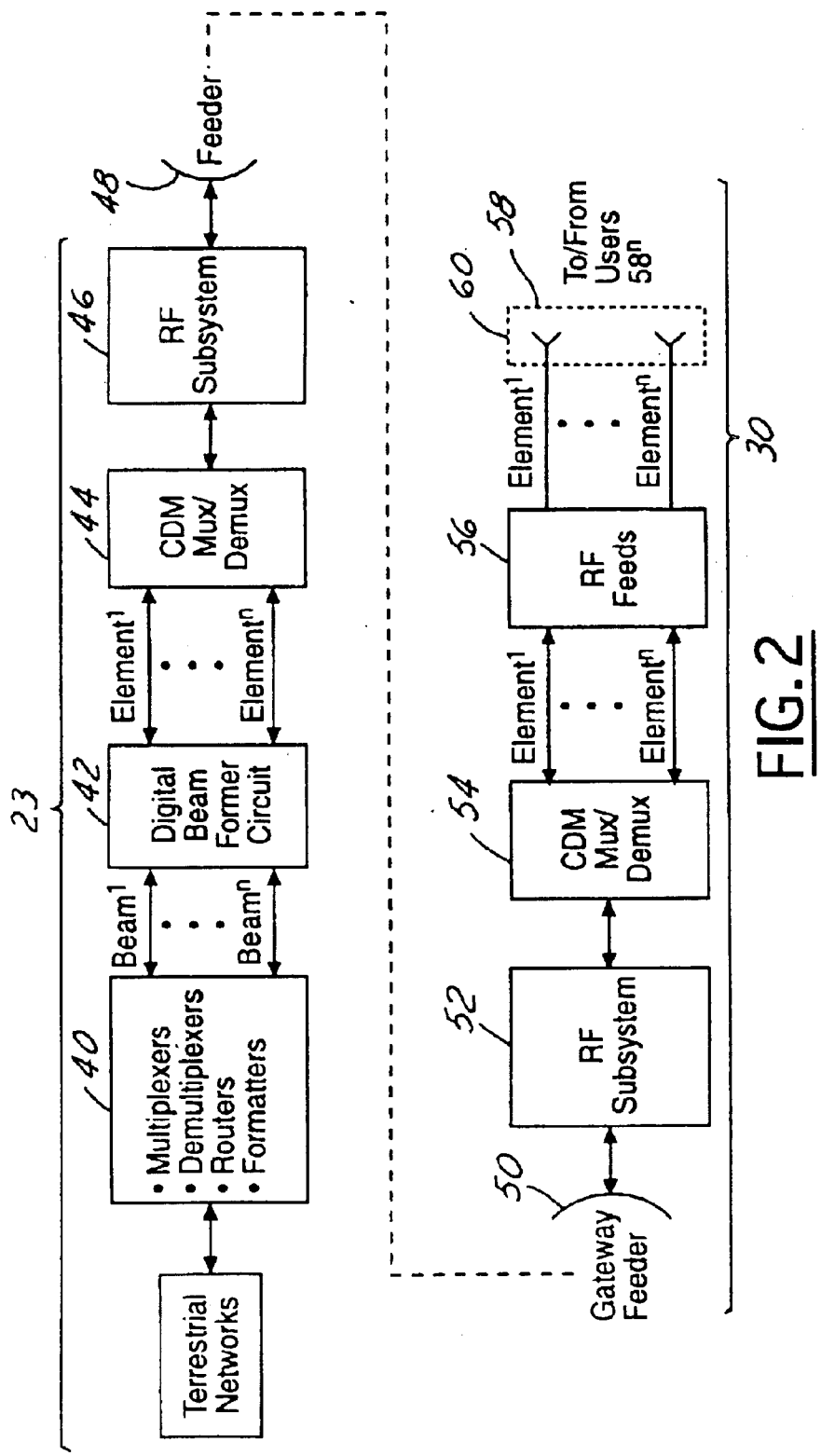
FIG. 2 is a high-level block diagrammatic view of the gateway station and payload platform having a digital beam forming circuit according to the present invention.

Referring now to FIG. 2, a block diagrammatic view of ground processing facility 23 and payload 30 are illustrated. Ground processing facility 23 that may be within gateway station 20 has an interface electronics 40 that may represent a plurality of different circuits. For example, beam generator 40 may comprise multiplexers, demultiplexers, routers and formatters. The interface electronics 40 may receive signals from the terrestrial networks 22 or may route various signals from different downlink beams from the platform 18 to the corresponding uplink bins. The "content" of all the uplink beams is placed into these buffers in the interface electronics 40. As illustrated, the signals of beam$^1$ through beam$^n$ represent the buffered "content" that generated by interface electronics 40 and will be sent next to digital beam former circuit 42. The buffered signals are coupled to digital beam former circuit 42. Digital beam former circuit 42 generates element control signals that are ultimately used to control the phase array elements of the platform 18. Digital beam former circuit 42 "scales" all user signals by (1) dividing each user signal into number of paths, each corresponding to one element, (2) multiplying each user signal component according to the signal direction by amplitude and phase weighting, and (3) adding various user components together element by element, and (4) putting the component sum to corresponding element bins. As a result, the user direction information have been embedded in the way the overall signal set is organized, not by separated direction control signals. As will be further described below in FIG. 3, interference from other beams may be estimated based on their respective positions and used to generate interference values for adaptively canceling the interference in a beam from other beams.

The digital beam former circuit 42 forms a plurality of element signals of element$^1$ through element$^n$. The element signals are coupled to code division multiplexers/demultiplexer 44. The bundled element control signals are then provided to an RF subsystem 46 that is used to transmit the aggregated signals through feeder antenna 48 to the high altitude communication platform 18. The platform 18 has an antenna 50 used to receive the aggregated element-signals from the gateway station 20. The feeder link antenna 50 is coupled to an RF subsystem 52 that processes the received signals in a conventional manner, including amplification, filtering and frequency down conversion. The RF subsystem 52 is coupled to code division multiplexer/demultiplexer 54 that separates the aggregated signals to individual element signals; the signals of element$^1$ to that of element$^n$. The demultiplexer 54 has regenerated all the element signals developed by digital beam former circuit 42 on ground as discussed above. The regenerated element signals are sent to RF feeds 56, that provide the signals to the radiating aperture 58 of the phased array antenna 60. There are no phase shifters in the array. The element phasings for each beam are implemented in the digital beam former on ground and are embedded in the signal overall structure. All user signals will be transmitted simultaneously through the aperture. Thus, a user (user A) signal radiated from various elements will ultimately be added coherently in the designated direction (say, direction A) in far field, while other user signals designated for other directions will be added randomly in direction A. Similarly, in the far field along direction B, signals designated for other users at the same frequency band but designated for different directions will be added non-coherently.

Those skilled in the art would recognize that the ground processing facility 23 and payload 30 are also used for receiving signals from the users. Such systems operate in a reverse manner from that described above and therefore is not repeated.

Figure 3:
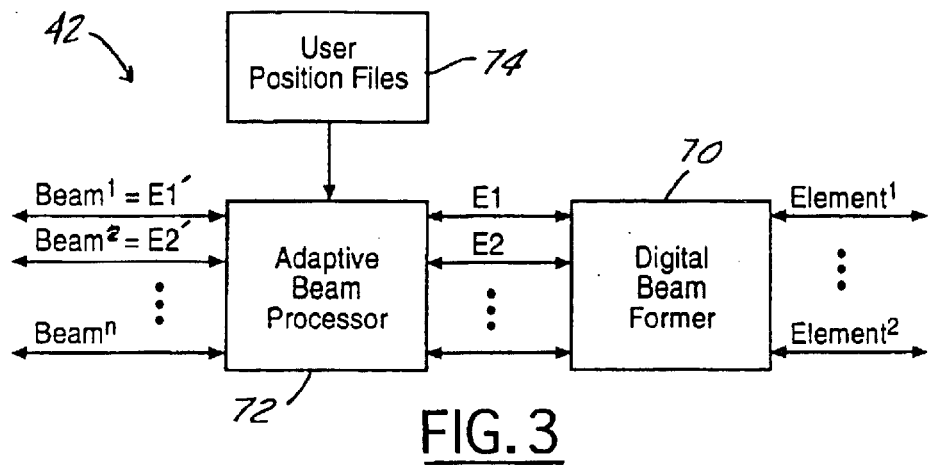
FIG. 3 is a diagrammatic view of the digital beam forming circuit according to the present invention.
Figure 4:
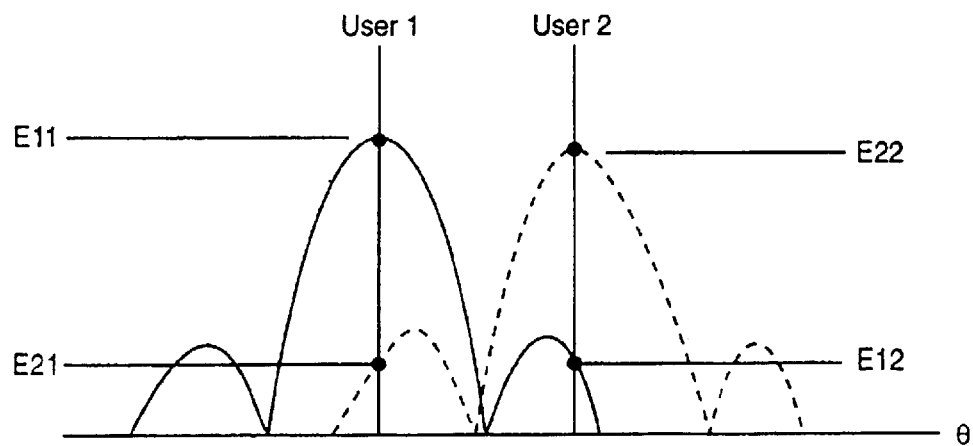
FIG. 4 is a plot illustrating interference of two beams.

Referring now to FIGS. 3 and 4, the digital beam former circuit 42 described above is illustrated in further detail interference rejection capability. Digital beam former circuit 42 has a digital beam former 70 that performs substantially all of the functions described above with respect to digital beam former circuit 42. In addition, digital beam former circuit has an adaptive beam processor 72 that is coupled to code division multiplexer/de-multiplexer 44. Adaptive beam processor 72 is coupled to user position files 74 that are stored within the ground based system. Because inter-beam interference limits throughput of the stratospheric platform wireless system, adaptive beam processor 72 together with user position files 74 reduces interference between the beams. Throughput in a CDMA system is limited by the number of times a given set of orthogonal code addresses can be reused in the coverage area.

As illustrated best in FIG. 4, two user beams user1 and user2 are illustrated. The output at digital beam former of each beam is E12. The output at digital beam former is formed according to the following equations:

$$E1 = E11 + E12$$

$$E2 = E21 + E22$$

Eij is the receive signal in the i-th channel from the j-th user, ij=1,2. Both E11 and E22 are the desired signals from the mainlobe of the antenna. E12 and E21 are interference signals coming from side lobe of the antenna from the other user. E11 and E21 are identical except for a complex constant C21 since they are both found in user1. So that:

$$E21 = C21 * E11, \text{ and}$$

$$E12 = C12 * E22$$

The adaptive beam processor 72 extracts two output signals E1' and E2' from the input E1 and E2 as follows:

$$\begin{aligned} E1' &= E1 - C12 * E2 \\ &= E11 + E12 - C12(E21 + E22) \\ &= E11 - C12 * C21 * E11 \\ &= E11(1 - C12 * C21) \sim E11 \end{aligned}$$

The magnitude of C12 and C21 are approximately the ratio of the side lobe level relative to the mainlobe level of the beam. That is, C12 and C21 are small. For example, in a −20 dB side lobe level antenna design, the C12 and C21 would be approximately 0.1. Of course, the exact number depends on the user location and the transmitted power. However, because C12 and C21 are very small fractions, the product C12*C21 is also very substantially smaller than one and therefore, the output E1' is a better approximation than E1 to the signal E11. Similarly, $$E2' = E2 - C21 * E1 \sim E22$$

By using the user position files 74, the numbers for C12 and C21 can be estimated by correlating the user positions to the antenna radiation pattern. Thus, the interference of the adjacent beams may be compensated for at the output of adaptive beam processor. In a similar manner, each of the interference of each of the beams may be compensated for in the adaptive beam processor in a similar manner.

While the best modes for carrying out the invention have been described in detail, those familiar with the art to which this invention relates will recognize various alternative designs and embodiments for practicing the invention as defined by the following claims.

What is claimed is:

1. A communications system comprising:
   stratospheric platform having a payload controller and a phased array antenna having a plurality of elements; and
   a gateway station in communication with said atmospheric platform, said gateway station scaling the plurality of elements to form a reconfigurable plurality of beams, said gateway station communicating a control signal to the stratospheric platform to communicate a scaling of elements having adaptive interference rejection, wherein the gateway station comprises a digital beam former circuit having a digital beam former, an adaptive beam processor coupled to user position files, said digital beam former circuit coupled to the beam generator, the digital beam former generates a plurality of element control signals, said adaptive beam processor generating said adaptive interference rejection.

2. A communications system as recited in claim 1, wherein the payload controller comprises a demultiplexer for receiving control signals.

3. A communications system as recited in claim 2, wherein the demultiplexer generates a plurality of element control signals.

4. A system as recited in claim 3, wherein the element control signals are coupled to an RF feed, the RF feed is coupled to elements of said phased array antenna.

5. A system as recited in claim 1, wherein the gateway station comprises a beam generator for generating beam signals.

6. A system as recited in claim 1, wherein said gateway station further comprises a multiplexer/demultiplexer.

7. A system as recited in claim 6, wherein said multiplexer/demultiplexer comprises a code division multiplexer/demultiplexer.

8. A system as recited in claim 1, wherein said ground station is coupled to a terrestrial network.

9. A system as recited in claim 8, wherein said terrestrial network comprises the Internet.

10. A system as recited in claim 8, wherein the terrestrial network comprises the public service telephone network.

11. A communications system, comprising:

a ground station having;

a beam generator for generating a plurality of beam control signals, a digital beam former circuit receiving the beam control signals and generating a plurality of first element control signals having adaptive interference rejection in response to the beam control signals, a multiplexer multiplexing the first element control signals, and an RF subsystem for communicating an RF signal corresponding to the first element control signals;

a stratospheric platform having;

a payload receiver for receiving the RF signals, a demultiplexer demultiplexing the RF signals into a second plurality of element control signals corresponding to the first element control signals and generating a plurality of beams in response to the second plurality of element control signals.

12. A system as recited in claim 11, wherein said ground station comprises a gateway station.

13. A system as recited in claim 11, wherein said ground station is coupled to a terrestrial network.

14. A system as recited in claim 13, wherein said terrestrial network comprises the internet.

15. A system as recited in claim 14, wherein the terrestrial network comprises the public service telephone network.

16. A system as recited in claim 11, wherein a digital beam former circuit having a digital beam former, an adaptive beam processor coupled to user position files, said digital beam former circuit coupled to the beam generator, the digital beam former generates a plurality of element control signals, sad adaptive beam processor generating said adaptive interference rejection.

17. A method of controlling a communications system having a stratospheric platform with a phased array antenna with a plurality of elements, said method comprising the steps of: forming a plurality of beams in a gateway station by scaling a plurality of elements using adaptive interference rejection by estimating interference values from user position values and creating said adaptive interference rejection by subtracting interference values from the plurality of beams, wherein said step of forming comprises the step of estimating interference on a first beam from a second beam; communicating the scaling of elements to a stratospheric platform; and generating the beams in response to the scaling of elements by the stratospheric platform.

* * * * *